Nov. 13, 1951  E. H. FREDRICKSON  2,575,053
POWER SYSTEM CONTROL
Filed June 27, 1946
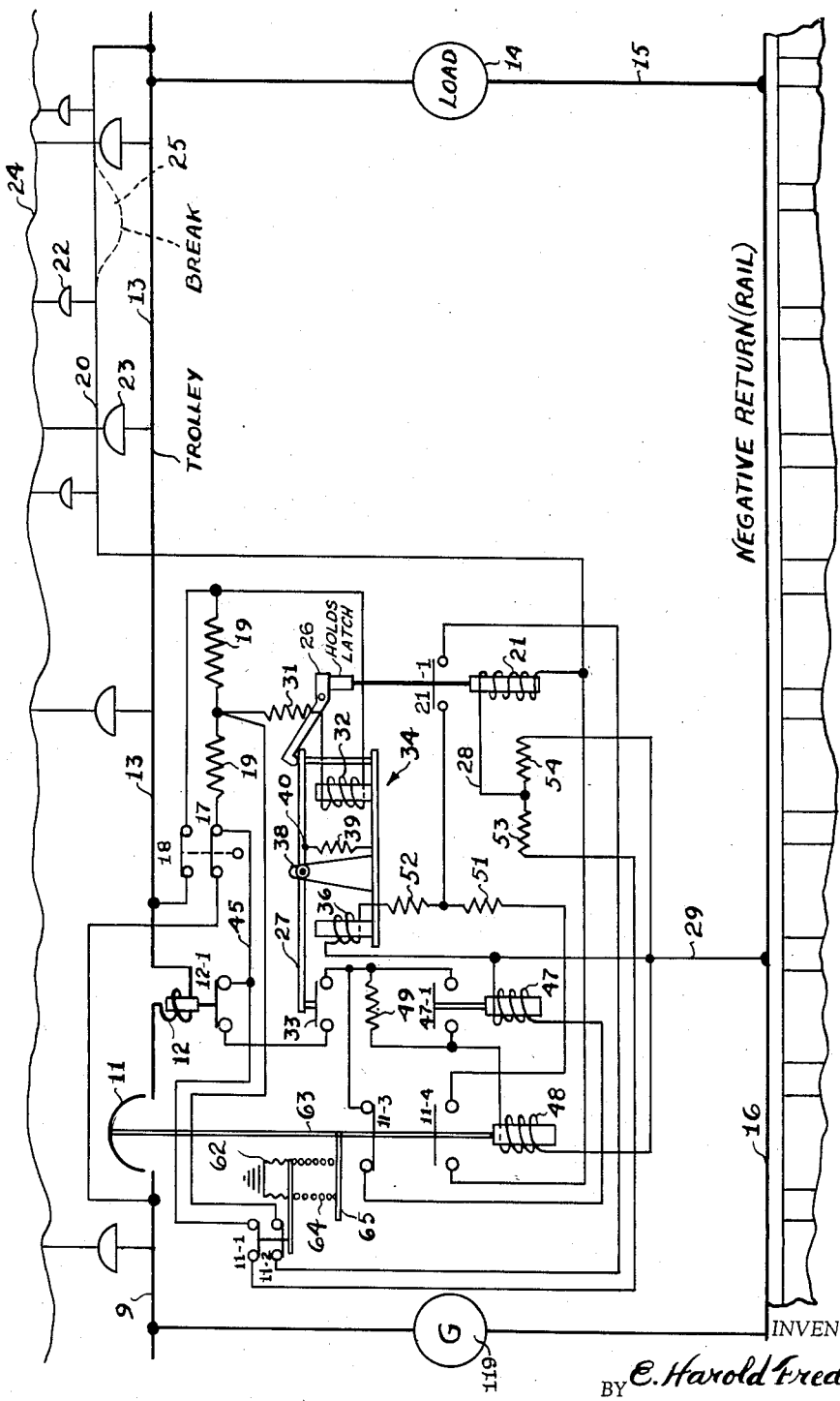
INVENTOR.
BY E. Harold Fredrickson
Ostrolenk + Faber
ATTORNEYS.

Patented Nov. 13, 1951

2,575,053

UNITED STATES PATENT OFFICE 2,575,053

POWER SYSTEM CONTROL

E. Harold Fredrickson, Philadelphia, Pa., assignor to I-T-E Circuit Breaker Company, Philadelphia, Pa., a corporation of Pennsylvania Application June 27, 1946, Serial No. 679,624

4 Claims. (Cl. 175—294)

My invention relates to electrical systems, and more particularly relates to electrical systems employed in mines for protection against fire hazards.

In the power supply systems to mines, a danger of falling roofs exists which may become a fire hazard if the electrical protective equipment which is at a remote point and which usually consists of a reclosing circuit breaker operates to reclose the line on a short circuit which has been caused by a falling roof.

It is desirable in such systems to provide circuit arrangements which will permit reclosing of the circuit breaker in response to normal faults but will prevent the reclosing of the breaker in the event the fault has been caused by a falling roof.

It has heretofore been proposed to accomplish this result by a pilot wire which extends along and parallel with the trolley and above it so that in the event of a falling roof, the break in the trolley wire interferes with the electrical circuit operations for effecting a reclosing of the circuit breaker.

In such systems, however, the load measuring relay lock-out coils are controlled in accordance with the voltage of the load. It is desirable, however, that independently of any fluctuation of load condition, the reclosing operation of the circuit breaker shall be effective if there has been no break in the roof and shall be prevented from operating in the event that the roof has broken.

Accordingly an object of my invention is to provide a novel circuit arrangement for my mine power circuits in which the control of the reclosing circuits for the circuit breaker is dependent solely on the condition of the pilot wire.

A further object of my invention is to provide a novel circuit arrangement in which reclosing of the circuit breaker is also dependent upon the condition of the load.

There are other objects of my invention which, together with the foregoing, will appear in the following description in connection with the figure which is a circuit diagram of one embodiment of the invention.

With the circuit breaker 11 in closed position, power is fed from the power line 9 over the contacts of the circuit breaker 11 through the overload relay 12 to the trolley wire 13, load 14, conductor 15, and returned over the negative return rail 16.

It will now be assumed that the circuit breaker 11 has been tripped open due to some abnormal circuit conditions resulting in the energization of the overload relay 12, but that there has been no break in the roof in any way effecting the pilot wire. When the circuit breaker contacts open, a by-pass circuit around the contacts of the circuit breaker is completed through the contacts 17 and 18 and including the load measuring resistor 19.

In this circuit the contacts 17 and 18 are manually operable and normally held closed so that the by-pass circuit is immediately effective upon the opening of the contacts of the circuit breaker. Shortly after opening of the circuit breaker a circuit is completed for testing the condition of the pilot wire 20. This circuit extends from conductor 9 through the contacts 17 and 11—1, resistor 53 through the winding of the load measuring relay lock-out coil 21, the pilot wire 20 and thence to the trolley wire 13 and to the load 14.

The contact 11—1 in this circuit is mechanically connected to the contacts of the circuit breaker 11 and so arranged that with the circuit breaker in closed position, contact 11—1 is opened. A short interval of time after the circuit breaker contacts have been tripped open, contact 11—1 is arranged to close completing the above described circuit and effecting energization of the load measuring relay lock-out coil 21 if the pilot wire is not broken and is connected to the trolley wire 13.

It will be noted that the pilot wire 20 parallels trolley 13 and extends above it. Both are suspended by insulators 22 and 23 from a mine roof 24. The essence of the present invention, as will appear from the description herein, resides in preventing reclosing of the circuit breaker 11 if the roof falls causing a break in the pilot wire as schematically illustrated at 25.

The load measuring relay lock-out coil 21 when energized over the circuit described above including the pilot wire 20 functions to remove a latch 26 to permit the operation about to be described.

It will be noted that in parallel with the above described circuit for the winding of relay 21, a circuit extends over the lower conductor 28 and the second resistor 54 to the conductor 29 and thence to the negative return rail 16. This circuit insures operation of relay 21 irrespective of load conditions, the first described circuit being effective only if there is a load on the circuit. If there is no load on the circuit at the time the circuit breaker operation occurs, then the relay 21 will find an energizing circuit from power supply 9 over the trolley 13, over the pilot wire 20 and through winding 21 in a reverse direction from that described above, and thence over the conductor 28, resistance 54 and conductor 29 to the negative return rail 16. Thus relay 21 will be energized whether there is or is not a load at 14 and irrespective of the condition of the load, the current flow through winding 21 merely being reversed in the case of no load, or over the load circuit when a load does exist at 14.

A further energizing circuit is at this time established from the mid-point of the load measuring resistor 19 through resistor 31 to load measuring relay holding coil 32. Energization of the winding 32 at this time functions to maintain its armature contacts 33 in disengaged condition.

It will be noted that the relay 34 comprises two windings 32 and 36. Winding 32 is the load measuring relay holding coil, the circuit for which has just been described. Winding 36 is the load measuring relay closing coil. An armature 27 pivotally mounted at 38 is normally biased by a spring 39 mounted at 40 and normally holds the armature 27 disengaged from contacts 33.

In addition to the contact 11—1 which is mechanically connected to the circuit breaker through the arm 65, the spring 64 and the time delay device 62 and is operated thereby, the contact 11—2 is also mechanically controlled by the circuit breaker and is arranged to close a short interval of time after the closing of contact 11—1. Closing of the contact 11—2 extends an energizing circuit from the line 9 through contacts 17 to the mid-point of the load measuring resistor 19 and through the closed contacts 11—2 and 21—1 and resistor 52 through the winding of the load measuring relay closing coils 36 to the negative return rail 16.

It will be noted that the energizing current through the winding 36 is dependent on the voltage drop through one-half of the windings of the load measuring resistor 19 and on the voltage across the load 14. This is so because the portion of the circuit trace above for the winding 36 is parallelled by a second circuit through the second half of the resistor 19 through contacts 18 to the trolley 13 and thence over the fault or load to return conductor 16. The voltage across the winding 36 therefore is that voltage from the mid-point of the resistor 19 through the right half winding and through the fault. This is in distinction from the energization of the winding 32 which is connected across the second half of the load measuring resistor 19.

If the short circuit is severe, the voltage drop be small and winding 36 will not be sufficiently energized to pull armature 27 against the action of spring 39. If, however, normal conditions obtain at the load, winding 36 is energized and operates armature 27 to engage contacts 33.

A circuit is thereupon completed from the power line 9 and contact 17 over conductor 45 through closed contacts 12—1 (overcurrent relay 12 is now de-energized) and contacts 33 closed by the energization of winding 36 (as described above) and through the normally closed contacts 11—3 through the winding of closing control relay 47 to the negative return rail 16. Relay 47 is thus energized in preparation for reclosing the circuit breaker in view of the test which has been made by relay 36 which indicated that the short circuit was not severe, and in view of the energization of relay 21 which indicated that the failure was not due to a break of the trolley wire. Reclosing operations of the circuit breaker would now be set in the operation of testing the short. The above described circuit included contact 11—3 which is an auxiliary switch contact and operated to closed position when the circuit breaker is opened.

Energization of the relay 47 as a result of the above described circuit closes its armature contacts 47—1 and completes an energizing circuit for the reclosing winding 48.

Although a circuit for this relay had previously been closed over the resistance 49, this resistance was of such a value as to prevent energization of the winding 48. Upon the closing of the contacts 47—1 a by-pass circuit around 49 is provided permitting sufficient current to flow through the winding 48 for its energization.

As a result of operation of reclosing magnet 48, the circuit breaker is reclosed. The first effect of the reclosing of the circuit breaker 11 is to open contact 11—1. However, the circuit for the load measuring relay lock-out coil 21 is still at this time completed over the trolley wire 13 and through the pilot wire 20 and over conductor 28 to the negative return rail 16.

The opening of the contacts 11—2 which follows the reclosing of the circuit breaker does not at this time de-energize the winding 36 since this relay will find an energizing circuit through the closed contacts 11—4 which are auxiliary switch contacts closed when the circuit breaker is closed. This circuit extends from the power line 12 over trolley 13 through the pilot wire 20, contacts 11—4 and through the winding 36 to the negative return rail 16. This circuit was not sufficient to energize the relay previously because the drop in resistors 51 and 52 reduced the current below the pull up value for the winding 36, but this current is sufficient to maintain the winding 36 energized.

As a result, however, of the reclosing of the circuit breaker 11, closing control relay 47 is de-energized by the opening of contacts 11—3. De-energization of relay 47 opens contacts 47—1 and allows the closing magnet winding 48 to remain energized by a circuit extending from contact 33, through resistor 49, through winding 48, and to the negative return rail 16.

The circuit breaker is now back in normal operating condition and if the fault is cleared, will remain closed. If the fault again occurs, the above described operations in general are repeated following the energization of overcurrent relay 12 which trips the breaker closing contacts 11—1, 11—2, 11—3, etc. Reclosing control relay 47 is re-energized for starting the reclosing operations.

As has been stated, it is desired that the above described reclosing features shall not be effected when the pilot wire breaks and the circuit breaker trips for this reason, and it will now be assumed that such a condition obtains. In response to a break in the pilot wire, the energizing circuit above described for the relay 21 has opened at the point of break since it will be recalled the circuit for relay 21 was completed through the pilot wire. The circuit for winding 36 has also opened since this circuit also was energized through a circuit including the pilot wire.

De-energization of the winding 36 causes its armature 27 to drop back and disengage its back contacts 33. De-energization of the relay 21 opens contacts 21—1. The fact that the contacts 21—1 have opened prevents the winding 36 from again being energized regardless of load condition. De-energization of the winding 36 also opens the circuit for the winding 48 at the contacts 33 to prevent reclosing of the circuit breaker. Accordingly none of the previously described operations can be effected for reclosing the breaker and the breaker will therefore remain open until the pilot wire has been repaired.

When the pilot wire is repaired, a circuit is completed for the relay 21 which circuit includes contacts 17, and 18, shunting the circuit breaker and includes the pilot wire now repaired, the winding 21, the wire 28, the resistor 54, and the negative return rail 16.

Energization of the relay 21 causes it to close contact 21—1 and if now the load is normally open-circuited or if there is no excessive load or short circuit, the winding 36 may be re-energized in the manner described in detail above for reclosing the circuit breaker.

Summarizing the above, the sequence of operations is as follows:

1. When the circuit breaker 11 is in the open position, control current is by-passed around the circuit breaker and through the manual control switches 17 and 18.

2. This by-passes a load measuring current around the circuit breaker 11 through the load measuring resistor 19 through the load and back to the negative return.

3. The closing of the advanced time delay closing contact 11—1 places the load measuring relay lockout coil 21 across the load measuring resistor 19. If the pilot wire is broken due to a roof fall, the load measuring relay lockout coil 21 will not pick up. This leaves the load measuring relay contacts 33 latched open. If the pilot wire is intact, the lockout coil 21 unlatches the load measuring relay contacts 33.

4. The closing the delayed time delay closing contact 11—2 places the load measuring relay holding coils 32 and closing coils 36 in proper relation for measuring the resistance of the load circuit.

5. If the load conditions are satisfactory, the load measuring relay contacts 33 close and energize the closing control relay 47 which picks up and short-circuits the resistor 49 causing the circuit breaker 11 to close.

6. The closing of the circuit breaker 11 opens the time delay contacts 11—2 and 11—1, opens the auxiliary switch contacts 11—3, and closes the auxiliary switch contact 11—4 which energizes the load measuring relay closing coils 36 by means of the pilot wire.

7. If the pilot wire breaks, these coils are de-energized and the load measuring relay contacts 33 open thus opening the circuit breaker 11.

It will now be clear that the systems of the invention herein described reside in the preparatory circuit effected mechanically by the energization of the relay 21.

The winding 36 which is operable over a range of voltage of about 100 volts is not marginal and will effect reclosing of the breaker unless a very serious short circuit condition obtains. In order to accomplish this result, the energization of winding 36 is independent of the pilot wire, its energizing being completed at half the voltage drop of the resistor 19. On the other hand, by my novel arrangement energization of the winding 36 can only be effected when relay 21 is energized over a circuit which is controlled by a pilot wire. This I provide a relay which is independent in its energization of the load or its condition but nevertheless cannot be effective unless the pilot wire is in operative condition.

I claim:

1. In a power protective system, a source of energy, a load, circuit connection therebetween, a circuit breaker connected in said circuit connection for controlling the application of power from said source to the said load, said circuit breaker having reclosing means for reclosing said circuit breaker in response to a fault, a pilot wire extending along and above said circuit and electrically connected to said circuit at said load, electromagnetic means connected to said pilot wire, a load measuring relay means including circuit connections whereby said load measuring relay measures the load conditions, means including circuit connections whereby said reclosing means is controlled by said load measuring means, and means controlled by said electromagnetic means in said pilot wire circuit for controlling an effective portion of said load measuring relay, said last mentioned means comprising a latch in mechanical relation with the armature of said load measuring relay and preventing its operation when said electromagnetic means connected by said pilot wire is de-energized.

2. In a power protective system having a source of power, a load, circuit connections from said source of power to said load, and a circuit breaker connected in said circuit for controlling the circuit from said source of power to said load, means responsive to predetermined circuit conditions for tripping said circuit breaker, means for reclosing said circuit breaker, a relay having an armature and controlled by said load conditions for controlling said reclosing means, a pilot wire adjacent and connected to said circuit at its terminus, an electromagnetic means connected to said pilot wire, circuit connections including said source of power, pilot wire and electromagnetic means completed to energize said electromagnetic means and operative to de-energize said electromagnetic means when said pilot wire breaks, and a latch mechanism engageable with the armature of said relay and controlled by the energization of said electromagnetic means upon a break in said pilot wire for preventing the operation of said last mentioned relay.

3. In an electrical mine protective system, a circuit extending from a source of power to a load, a circuit breaker connected in the circuit from said source, means responsive to load conditions for opening said circuit breaker, means responsive to the opening of said circuit breaker for reclosing said circuit breaker, means including a pilot wire extending along said circuit responsive to a failure of the mine roof for preventing reclosing of said circuit breaker, and comprising a relay having an armature and controlled by said load conditions for controlling said reclosing means, an electromagnetic means connected to said pilot wire, circuit connections including said source of power, pilot wire and electromagnetic means completed to energize said electromagnetic means and operative to de-energize said electromagnetic means when said pilot wire breaks, and a latch mechanism engageable with the armature of said relay for preventing the operation of said last mentioned relay when the pilot wire breaks, said load controlled relay being responsive to a repair of said roof for automatically restoring said circuit conditions for reclosing said circuit.

4. In a power protective system having a source of power, a load, a circuit from said source of power to said load and a circuit breaker for controlling the circuit from said source of power to said load, means responsive to predetermined circuit conditions for tripping said circuit breaker, means for reclosing said circuit breaker, a relay controlled by said load conditions for controlling said reclosing means, a pilot wire adjacent and connected to said circuit, at its terminus a second relay having an energizing circuit including said pilot wire, said energizing circuit opening when said pilot wire breaks and a lock mechanism controlled by de-energization of said second relay for locking said first relay against operation in the event said pilot wire breaks.

E. HAROLD FREDRICKSON.

REFERENCES CITED

The following references are of record in the file of this patent:

UNITED STATES PATENTS

| Number | Name | Date |
| --- | --- | --- |
| 395,533 | Woods | Jan. 1, 1889 |
| 554,263 | Guilleaume | Feb. 11, 1896 |
| 1,710,895 | Raney | Apr. 30, 1929 |
| 2,259,965 | Taliaffero | Oct. 21, 1941 |
| 2,345,155 | Reagn | Mar. 28, 1944 |

FOREIGN PATENTS

| Number | Country | Date |
| --- | --- | --- |
| 9,056 | Great Britain | May 7, 1895 |
| 4,088 of 1901 | Great Britain | Feb. 26, 1902 |
| 14,463 | Great Britain | July 8, 1908 |